March 17, 1964     L. F. WILMHOFF     3,125,316

THEFT-PROOF MOUNTING FOR MIRRORS AND THE LIKE

Filed May 22, 1961

INVENTOR.
LOUIS F. WILMHOFF,
BY

ATTORNEYS.

United States Patent Office 3,125,316
Patented Mar. 17, 1964

3,125,316
THEFT-PROOF MOUNTING FOR MIRRORS
AND THE LIKE
Louis F. Wilmhoff, Ludlow, Ky., assignor to The F. H.
Lawson Company, Cincinnati, Ohio, a corporation of
Ohio
Filed May 22, 1961, Ser. No. 111,739
1 Claim. (Cl. 248—28)

This invention relates to mounting means for permanently securing the back of a mirror or similar object to a supporting surface, such as a wall, and has to do more particularly with a mounting bracket or back member provided with one or more key hole slots arranged to engage over the heads of mounting screws secured to the supporting surface, the bracket or back member being provided with spring clip members, coacting with the key hole slots and arranged to engage beneath the heads of the mounting screws so as to prevent subsequent disengagement of the mounting screws from the key hole slots.

While the instant invention will find particular utility in the essentially theft-proof mounting of mirrors, it will be obvious as the description proceeds that its utility is not so limited and that the instant invention will be useful in mounting diverse articles to a supporting surface.

A principal object of the instant invention is to provide an essentially permanent and theft-proof mounting device which is of extremely simple and inexpensive construction and yet is highly effective in securing a mirror bracket or the like to mounting screws or other similar studs fixedly secured to the supporting surface.

Still another object of the invention is the provision of a mounting means of the character described which is extremely simple to install, the user having simply to fit the enlarged portions of the key hole slots over the heads of the mounting screws, whereupon movement of the backing member in a direction to cause the narrow or neck portions of the key hole slots to engage about the shanks of the mounting screws automatically effects locking engagement of the spring clip members and prevents subsequent movement of the backing member relative to the mounting screws.

The foregoing together with other objects of the instant invention which will appear hereinafter or which will be apparent to the skilled worker in the art upon reading this specification, I accomplish by that construction and arrangement of parts which I shall now describe in an exemplary embodiment.

Reference is now made to the accompanying drawing wherein.

Figure 1:
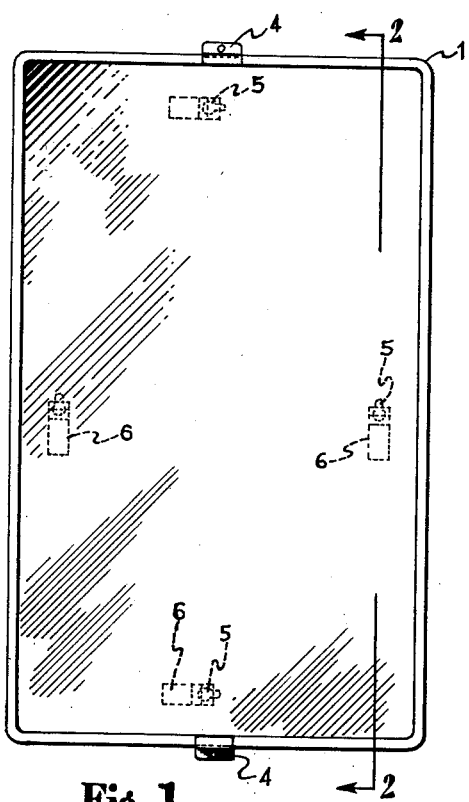
FIGURE 1 is a front elevational view of a framed mirror in accordance with the instant invention.
Figure 2:
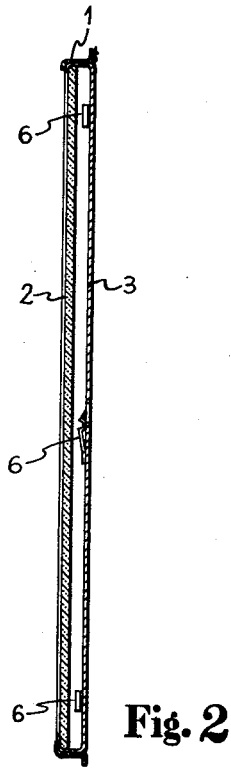
FIGURE 2 is a vertical sectional view taken along the line 2—2 of FIGURE 1.

Referring first to FIGURES 1 and 2 of the drawings, I have illustrated therein a conventional framed mirror comprising a rectangular frame 1 arranged to enclose and support a mirror 2, the mirror frame being provided with a backing member 3 lying in spaced relation to the mirror 2. The construction thus far described is conventional, as is the provision of mirror clips 4 which assist in securing together the several parts of the frame 1; and it is also customary to provide the backing with a plurality of key hole slots 5 arranged to engage the heads of mounting screws to secure the mirror to a wall. In this connection, it will be noted that the backing member 3 is spaced from the mirror 2 by a distance such as to permit the heads of the mounting screws to extend therebetween without contacting the mirror itself.

Figure 3:
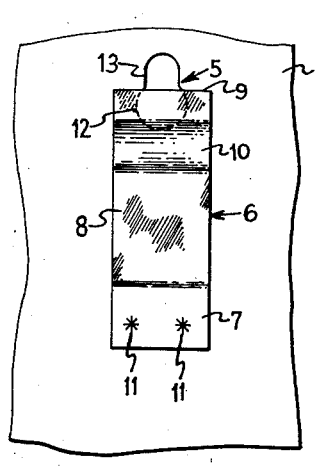
FIGURE 3 is an enlarged fragmentary front elevational view of the backing member, key hole slot and spring clip in accordance with the instant invention.
Figure 4:
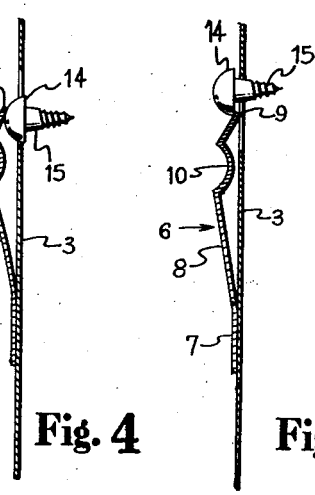
FIGURE 4 is an enlarged fragmentary vertical sectional view of the assembly shown in FIGURE 3, illustrating the manner in which the head of a mounting screw is caused to pass through the key hole slot.

In accordance with the instant invention, I provide each of the key hole slots 5 with a spring clip member 6 which, as best seen in FIGURES 3 and 4, may conveniently comprise an elongated rectangular strip of resilient metal bent to define a base portion 7, a flexible body portion 8, the body portion 8 terminating at its free end in a screw engaging inclined tongue 9 terminating in a free edge 9a. It will be understood that the spring clip member 6 may be configured in various ways, as by means of the convolute portion 10, to enhance its resiliency.

The spring clip member will be adhered to the inner surface of the backing member 3 in essentially the position illustrated in FIGURE 3, the base portion 7 being secured, as by spot welding 11 to the inner surface of the backing member with the screw engaging tongue 9 overlying the key hole slot, preferably with the enlarged portion 12 of the key hole slot underlying the end of the spring clip and the narrow or neck portion 13 of the key hole slot extending beyond the edge 9a of the clip.

It will be understood that the key hole slots 5 are intended to receive the heads 14 of mounting screws having a shank 15 which may be secured to the supporting wall surface, and heads 14 will be of a size to just nicely pass through the enlarged portions 12 of the key hole slots, whereupon movement of the backing member in the direction of the neck portions 13 will cause the neck portions to surround the shanks of the screws.

Figure 5:
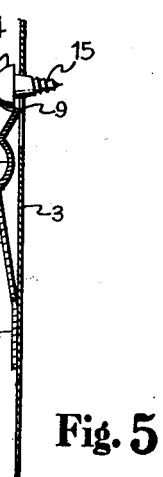
FIGURE 5 is an enlarged fragmentary vertical sectional view similar to FIGURE 4 but illustrating the parts in locked condition.

As will be apparent from FIGURE 4, as the enlarged portions of the key hole slots are fitted over the heads of the screws, the heads will deflect the free ends of the spring clip members inwardly in the manner illustrated, whereupon as the backing member is moved to cause the neck portion to engage about the shanks of the screws, the free ends of the clip members will engage beneath the heads of the screws, in the manner illustrated in FIGURE 5, thereby effectively locking the backing member against subsequent movement relative to the mounting screws.

As will be evident from FIGURE 1, the key hole slots and spring clip members may be arranged in coacting pairs angularly disposed with respect to each other, thereby enabling the user to selectively utilize either the horizontally aligned pair of slots or the vertically aligned pair, depending upon the position in which the mirror is to be hung. Such arrangement permits the mounting screws to be secured to a single stud as would be encountered in conventional wall construction. Other modifications may, of course, be made in the invention without departing from its spirit and purpose. Having, however, described my invention in an exemplary embodiment, what I desire to secure and protect by Letters Patent is:

A locking device for a wall mirror adapted to be secured to a wall surface, said device comprising a hanger having a shank portion projecting outwardly from the wall surface and an enlarged head lying in closely spaced relation to the wall surface, a backing member for said mirror spaced rearwardly therefrom, said backing member having a forwardly projecting frame surrounding and supporting said mirror and an outer surface adapted to be juxtaposed to the supporting wall, at least one key hole slot in said backing member, said key hole slot having an enlarged portion of a size to receive the head of said hanger and a neck portion of a size to receive said shank portion but sufficiently narrow to prevent the passage of said head therethrough, and a spring clip secured to the inner surface of said backing member in the space between said backing member and said mirror, said spring clip having a flexible body portion terminating at one end in a base portion fixedly secured to the inner surface of said backing member and a free edge remote from said base portion positioned to overlie said key hole slot with a portion at least of the neck of said key hole slot lying beyond the said free edge, the dimensioning of the parts being such that when the shank of the hanger is engaged in the neck portion of said key hole slot, the free end of said spring clip will engage beneath the head of said hanger, whereby attempted movement of the backing member in the direction to cause the shank of the hanger to enter the enlarged portion of said key hole slot will be arrested.

References Cited in the file of this patent

UNITED STATES PATENTS

| | | |
|---|---|---|
| 1,454,662 | Wilbur | May 8, 1923 |
| 1,625,163 | Schurr | Apr. 19, 1927 |
| 1,621,357 | Stuman | Dec. 16, 1952 |
| 2,628,050 | Hardwick | Feb. 10, 1953 |